United States Patent [19]

Sekine et al.

[11] Patent Number: 4,986,115
[45] Date of Patent: Jan. 22, 1991

[54] HOT-WIRE AIR FLOW METER

[75] Inventors: Yoshihito Sekine, Ibaraki; Nobukatsu Arai, Ushiku; Tadao Osawa, Katsuta; Hiroatsu Tokuda, Katsuta; Toshifumi Usui, Katsuta; Mitsukuni Tsutsui, Ibaraki, all of Japan

[73] Assignee: Hitachi, Ltd., Tokyo, Japan

[21] Appl. No.: 313,962

[22] PCT Filed: Jun. 15, 1988

[86] PCT No.: PCT/JP88/00577
§ 371 Date: Feb. 16, 1989
§ 102(e) Date: Feb. 16, 1989

[87] PCT Pub. No.: WO88/10411
PCT Pub. Date: Dec. 29, 1988

[30] Foreign Application Priority Data

Jun. 17, 1987 [JP] Japan .................. 62-148993

[51] Int. Cl.⁵ .......................... G01M 15/00
[52] U.S. Cl. .......................... 73/118.2
[58] Field of Search .................. 73/118.2

[56] References Cited

U.S. PATENT DOCUMENTS

| | | | |
|---|---|---|---|
| 4,179,925 | 12/1979 | Graham | 73/861.79 |
| 4,472,965 | 9/1984 | Krapp et al. | 73/118.2 |
| 4,478,075 | 10/1984 | Oyama et al. | 73/118.2 |
| 4,739,651 | 4/1988 | Smith | 73/118.2 |

FOREIGN PATENT DOCUMENTS

| | | | |
|---|---|---|---|
| 014968 | 6/1985 | European Pat. Off. | 73/118.2 |
| 0120121 | 7/1983 | Japan . | |
| 0135916 | 8/1983 | Japan . | |
| 0137716 | 8/1983 | Japan . | |
| 0065217 | 4/1984 | Japan | 73/118.2 |
| 0122523 | 8/1986 | Japan . | |

Primary Examiner—Robert Raevis
Attorney, Agent, or Firm—Antonelli, Terry, Stout & Kraus

[57] ABSTRACT

A hot-wire air flow meter for providing an air flow meter capable of accurately detecting the quantity of air drawn into the internal combustion engine and stabilizing the air flow distribution. The hotwire air flow meter includes a main passage forming an air horn for the internal combustion engine, a hot-wire element for measuring the quantity of air drawn in, a bypass passage installed in the main passage and containing the hot-wire element, the bypass passage consisting of a first passage formed along the main passage axis and a second passage formed in the radial direction of the main passage, and a throttled portion formed between the bypass passage and a throttle valve located downstream of the bypass passage.

17 Claims, 10 Drawing Sheets

HOT-WIRE AIR FLOW METER

DESCRIPTION

Background of the Invention

This invention relates to a hot-wire air flow meter and, more particularly, to a hot-wire air flow meter for internal combustion engines which forms a part of and air intake system of an automobile engine and which detects and controls a quantity of air drawn in the air intake system.

Hot wire air flow meters of the aforementioned type are disclosed in commonly assigned co-pending U.S. application Ser. Nos. 07/207,255 and 07/260,781.

Conventional hot-wire air flow meters for internal combustion engines are described in, for example Japanese Utility Model Application Laid-Open No. 170682/1984, Japanese Patent Application Laid-Open No. 79162/1985, and Japanese Utility Model Application Laid-Open No. 25558/1986, wherein the hot-wire air flow meter is located close to the throttle valve with a part or all of the fuel injection valves installed in the main air passage at a point downstream of the air flow meter inlet and upstream of the throttle valve. This type of air flow meter has a throttled portion formed on the wall surface of the main passage, somewhere downstream of a bypass passage outlet and upstream of the throttle valve. In a range downstream of the bypass passage outlet and upstream of the throttled portion inlet, there is no section of the main passage that is constant in cross section. As a result, in this region of the main passage, the pressure acting on a plane perpendicular to the main air flow is not stable, nor is the air speed distribution. This in turn gives rise to a problem that these unstable conditions have adverse effects on the air flow speed in the bypass passage which is varied accordingly.

The conventional air flow meters also have no special measures to reduce variations in the main-bypass air flow ratio, which results in an inability to detect the amount of air taken in with precision.

The object of this invention is to provide a hot-wire air flow meter that can stabilize the speed distribution of air drawn in and thereby measure the quantity of air accurately.

Another object of the invention is to provide an internal combustion engine that can perform an optimum control on air-fuel ratio by using the above hot-wire air flow meter.

A further object of the invention is to provide a method of manufacturing the above hot-wire air flow meter with ease.

The hot-wire air flow meter according to this invention includes a main passage forming an air intake flow passage for the internal combustion engine, a hot-wire element for measuring the quantity of air drawn in and a bypass passage installed in the main passage and containing the hot-wire element. The bypass passage includes a first passage formed along the main passage axis and a second passage formed in the radial direction of the main passage, with a throttled portion formed between the bypass passage and a throttle valve located downstream of the bypass passage.

The internal combustion engine according to this invention includes the above-mentioned hot-wire air flow meter, a speed sensor to detect the revolution speed of the engine, fuel injectors to inject fuel into drawn in air, and a controller to determine the amount of fuel to be injected according to the quantity of air intake detected by the hot-wire air flow meter and the revolution speed detected by the revolution speed sensor and to output to the fuel injectors signals representing the calculated amount of fuel to be injected.

The method of manufacturing the above-mentioned hot-wire air flow meter according to this invention is characterized in that the hot-wire air flow meter is die-cast by using inner molds, with the inner molds including: an inner mold having an abutting surface and an overlapping surface and being adapted to form the throttled portion, with a two divisible inner molds forming the bypass passage.

Since the construction of this invention has a large area for heat-exchange between the bypass passage wall and the main flow, the temperature in the bypass passage wall is always maintained close to the temperature of air being drawn in, thereby giving a good temperature characteristic.

The bypass passage has its section downstream of the hot-wire element formed perpendicular to the main flow with the outlet opening of that section parallel to the main flow. This configuration prevents the dynamic pressure of a reverse flow from being directly applied to the outlet opening and reduces the reverse air flow speed in the bypass passage. That is, the above bypass passage construction dampens the force of the reverse flow from backfire or the like entering the bypass passage and also reduces the speed of the reverse flow in the bypass passage, thereby preventing possible damages to the hot-wire element.

The throttled portion of a short length provided between the bypass passage and the throttle valve can stabilize the air flow speed distribution.

DETAILED DESCRIPTION

Figure 1:
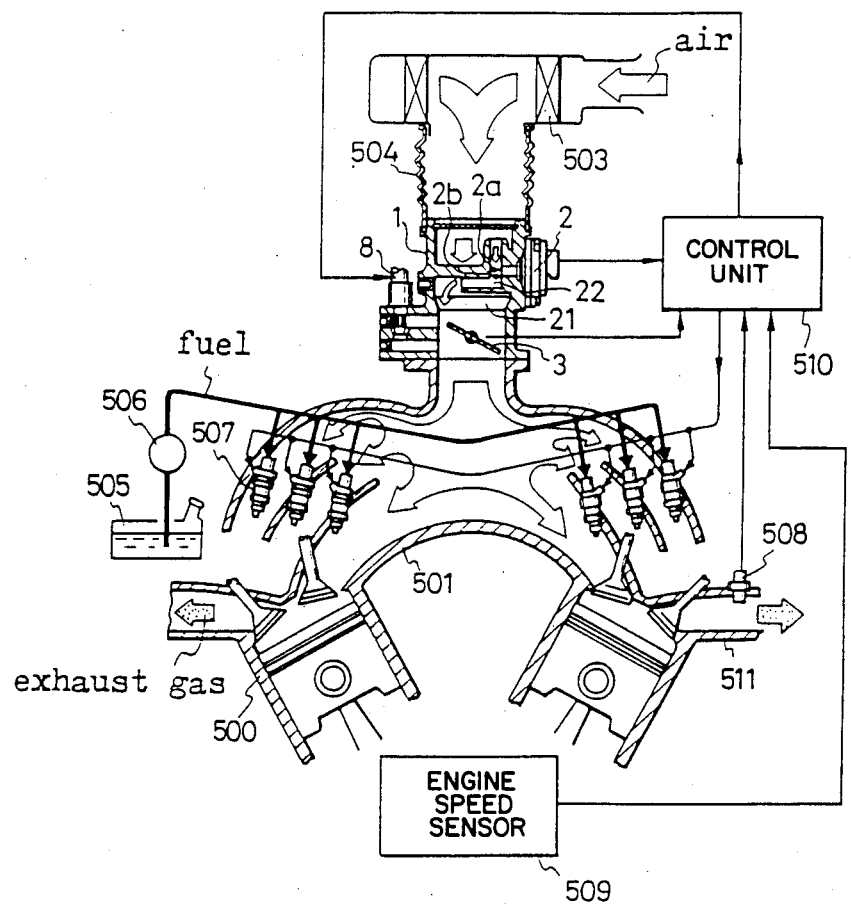
FIG. 1 is partially schematic cross-sectional view of an electronic-controlled fuel injection device to which the hot-wire air flow meter for internal combustion engines according to this invention is applied.

Referring now to the drawings wherein like reference numerals are used throughout the various views to designate like parts and, more particularly, to FIG. 1, according to this figure, in a hot-wire air flow meter for internal combustion engines, air, indicated by blank arrows, passing through an air filter 503, is drawn through an air horn 504, an air flow meter 1 and an intake manifold 501 into the engine cylinders 500 of an internal combustion engine. Protruding into a main passage 21 of the body of the air flow meter 1 is a bypass passage 22 which contains a hot-wire element 2a connected to a sensor circuit unit 2, and a temperature compensation element 2b. The air flow divides into the main passage 21 and the bypass passage 22. The amount of air that flows into the bypass passage 22 is measured and the total air flow is determined from the main-bypass ratio and then outputted to an associated circuit. A throttle valve 3, installed downstream of the bypass passage 22, is linked to an accelerator pedal (not shown) to control the amount of air intake. An idle speed control (ISC) valve 8 controls the air flow when the throttle valve 3 is fully closed. Solid arrows indicate the flow of fuel, with the fuel, pumped from a fuel tank 505 by a fuel injection pump 506, being injected from fuel injectors 507 into the intake manifold 501 and mixing with air that has passed the air flow meter 1, and then being drawn into the cylinders 500 of the engine.

A control unit 510 calculates the amount of fuel to be injected by the fuel injectors 507 ISC and the opening of valve 8 by using an output of the circuit unit 2, signal output representing a rotating angle of the throttle valve 3, output from an oxygen density sensor 508 installed in an exhaust manifold 511, and signal output from an engine revolution speed sensor 509. The fuel injectors 507 and the ISC valve 8 are controlled according to the result of calculation by the control unit 510.

Figure 2:
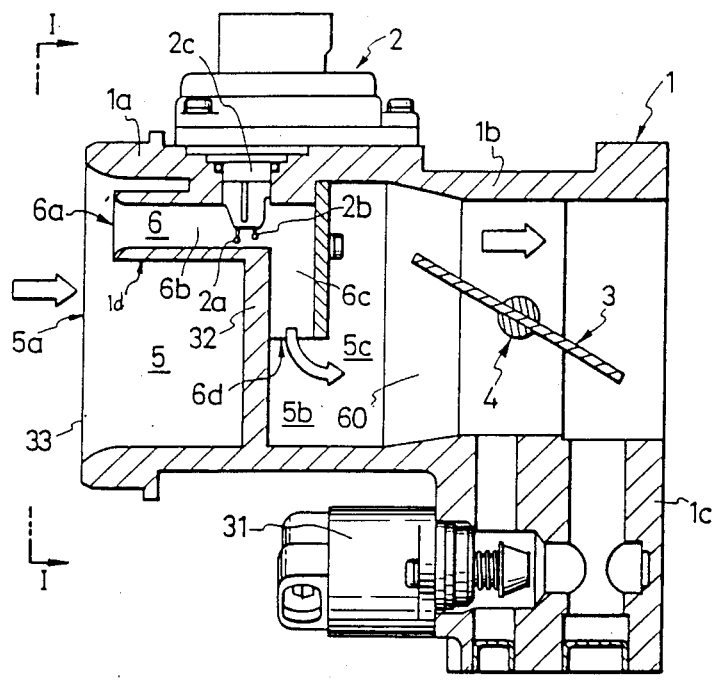
FIG. 2 is a cross-sectional view of a portion of the air flow meter of FIG. 1. taken along a vertical plane extending along a longitudinal axis of the air flow meter.
Figure 3:
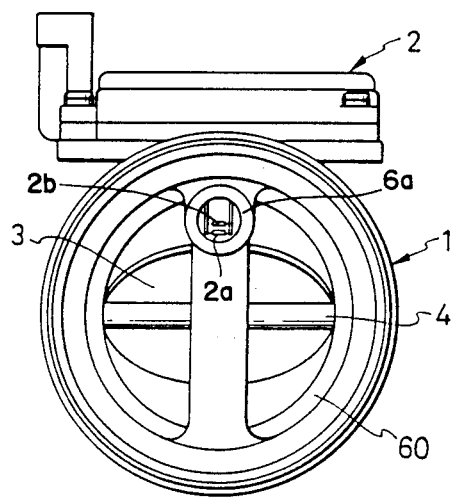
FIG. 3 is a view taken in the direction of the arrows I—I in FIG. 2.

As shown in FIGS. 2 and 3, a body 1 forms an air intake passage of an internal combustion engine, with the body 1 being connected with an air cleaner on the upstream side either directly or through a duct and, on the downstream side, with the intake manifold.

The body 1 includes three bodies, namely, an air flow meter body 1a on the upstream side, a throttle valve body 1b on the downstream side, and an idle speed control valve body 1c. The air flow meter body 1a is formed integral with and projects from the main passage 5 and has a bypass passage 6 formed therein. A hot-wire element holder 2c is installed in a hole which is cut into the body 1 from outside in a direction perpendicular to a path 6b in the bypass passage 6. Mounted on the body 1 of FIG. 2 are sensor circuit unit 2 including a hot-wire element 2a, a temperature compensation element 2b, a holder 2c and an electronic circuit connected to the hot-wire element 2a and temperature compensation element 2b, a throttle valve 3 to control the drawn in air quantity, a valve shaft 4 to rotate the throttle valve 3, and an ISC valve 31 to control the air flow during idling.

In the protruding portion 1d is formed an L-shaped bypass passage with a right-angle bent which includes two bypass passages, namely, a bypass passage 6b, circular in cross section and extending in parallel with the main passage 5 and having an inlet opening 6a on the upstream side of the air flow meter 1a, and bypass passage 6c rectangular in cross section and extends perpendicular to the first bypass passage 6b and having an outlet opening 6d in the main passage 5. The bypass passage 6 and the main passage 5 form a branching and merging path.

The inlet opening 5a of the air flow meter 1a and the inlet opening 6a of the bypass passage 6 both have the edges of their inner walls moderately throttled. The outlet 6d of the bypass passage 6 is disposed, parallel to the main flow at a portion 5b of almost minimum cross section in the main passage 5. Of the walls forming the bypass passage 6c running perpendicular to the main flow, an upstream wall 32 has its front edge formed semicircular in cross section so that the air flow will not easily be disturbed. The front end of the wall 32 is connected to the inner wall of the main passage 5 thereby preventing the outgoing flow at the outlet 6d of the bypass passage 6 from directly colliding with the main flow and allowing the bypass air to flow out in a desirable condition.

Connecting the upstream wall 32 of the bypass passage 6 to the inner wall of the main passage 5 is also advantageous in the manufacturing standpoint in that this structure assures an improved flow of molten metal in die-casting the air flow meter body 1.

In this hot-wire air flow meter, an electrically heated resistor is placed in an air stream and used as one of resistors forming a bridge circuit which keeps the temperature of the heated resistor constant. Any change in voltage across the heated resistor that occurs when heat produced is altered due to variations in air flow speed around the resistor is used to detect the amount of air flow. The bridge circuit is so constructed so as to keep the resistance of the heated resistor constant. The hot-wire element 2a is made by forming platinum or nickel whose resistance is highly dependent on temperature into wires or foils that may be used as is or may be wound on bobbins of ceramics, glass or polyimide resin or connected to boards of these materials. In the hot-wire air flow meter for internal combustion engines, a separate non-heated element is provided for temperature compensation in addition to the hot-wire element 2a and this element 2b also forms one of the resistors of the bridge circuit.

The bypass passage, including a path parallel to the main passage and containing the hot-wire element 2a and a path perpendicular to the main passage, allows a forward flow toward the engine, i.e., in the direction of drawing or suctioning the air into the engine, to pass therethrough at a speed almost equal to that of the main flow passing through the main passage 5. The bypass passage 6, however, retards a reverse flow substantially by the configuration of the bypass passage outlet 6d which is not directly applied with a dynamic pressure of the reverse flow and by the right-angle bend which acts as a fluid resistance element. Of the air flow meter body 1 a portion making up the bypass passage 6 is protruded into the main flow so that the air stream passes around it, keeping the temperature of the bypass passage wall almost equal to that of the main air flow by the cooling action of the main flow. By setting the length of the bypass passage 6c that is perpendicular to the main passage 5 to more than a half of the radius of the main passage 5, the air flow from the outlet 6d of the bypass passage 6 can be released downstream with a relatively small disturbance as the throttle valve 3 rotates counterclockwise from the fully closed position toward the fully open position, with the upstream portion of the air horn viewed to the left and with the base of the projecting bypass passage viewed above. When the main flow is in the reverse direction, the disturbed flow occurring at the lower end of the throttle valve 3 acts as a fluid resistance, thus hindering the reverse flow from entering the bypass passage 6. Of the walls of the bypass passage portion 6c perpendicular to the main passage 5, a bypass passage wall facing downstream acts to hinder the reverse flow from entering the bypass passage 6, protecting the hot-wire element 2a from backfire or other harmful reverse blowing.

In the hot-wire air flow meter 1, a throttled portion is formed on the main passage wall in a region which is downstream of a point almost the outlet size behind the bypass passage outlet 6d (the outlet size being measured in the meter axis direction) and upstream of a point about one-half the radius of the disk of the throttle valve 3 ahead of the valve shaft 4. This throttled portion increases the speed of air stream, i.e., the dynamic pressure in its vicinity by the flow constriction effect. As the Bernoulli theorem implies, a monotonous increase in dynamic pressure in the forward direction of the main flow, results in a corresponding monotonous reduction in the pressure gradient. As a result, the static pressure downstream of the throttled portion is lower than that upstream. Now, as the throttle valve 3 turns, the flow velocity distribution in a stream immediately downstream of the rear end of the throttled portion is altered, changing the static pressure distribution. At this time, because of the presence of the pressure gradient mentioned above, this pressure variation is blocked from propagating to the upstream of the throttled portion. Also by setting the point where the throttled portion begins somewhere behind the outlet 6d of the bypass passage 6, the main passage 5 is constant in cross section in a range downstream of the bypass passage outlet 6d and upstream of the inlet of the throttled portion. In this range there is no gradient in pressure and the pressure remains almost constant, so that the speed of air flow at the bypass passage outlet 6d is stabilized. Consequently, the air flow speeds in the bypass passage 5 and in the main passage remain stable when there are variations in the throttle valve angle. This in turn provides a stable main-bypass flow ratio.

Figure 4:
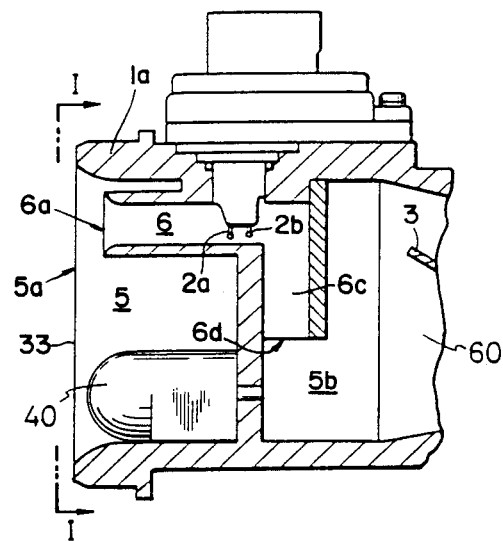
FIG. 4 is a vertical cross-sectional view of a second embodiment of the invention.
Figure 5:
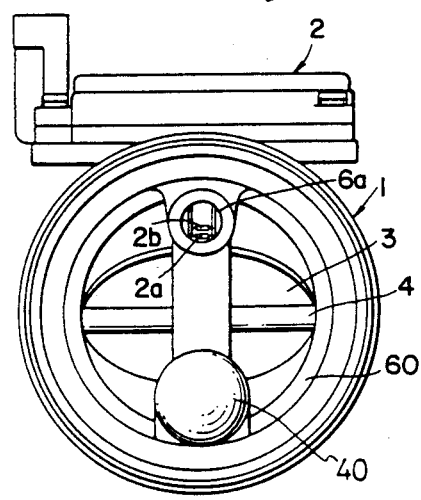
FIG. 5 is a view taken in the direction of the arrows I—I in FIG. 4.

In FIGS. 4 and 5, in a single point injection system, when a fuel injection valve 40 is provided upstream of the throttle valve 3, a portion that connects the outlet 6d of the bypass passage 6 and the inner wall of the main passage 5 can be used as a holder for the fuel injection valve 40. This results in an advantage that the main-bypass flow ratio when the fuel injection valve 40 is provided upstream is only slightly different from that when the fuel injection valve 40 is not provided upstream.

In these embodiments, a throttled portion 60 is provided on the inner wall of the body in a region downstream of the bypass passage outlet 6d where a part of the front end of the throttle valve 3 exists when it is fully open. It is effective to locate the throttled portion 60 in a region which is downstream of a point almost the outlet size behind the bypass passage outlet 6d (the outlet size being measured in the main flow direction) and upstream of a point about one-half the radius of the disk of the throttle valve 3 ahead of the valve shaft 4. That is, in FIG. 2, the throttled portion 60 reduces, by its flow constriction effect, the flow speed variation in the bypass passage 6 that occurs as the throttle valve 3 changes its rotating angle. The passage 5c is constant in cross section to make the pressure gradient in this region as small as possible, stabilizing the air flow out of the bypass passage outlet 6d. These constructional features allow the throttle valve 3 to be installed close to the outlet 6d of the bypass passage 6, making it possible to reduce the length of the hot-wire air flow meter 1 along the main axis direction.

Figure 6:
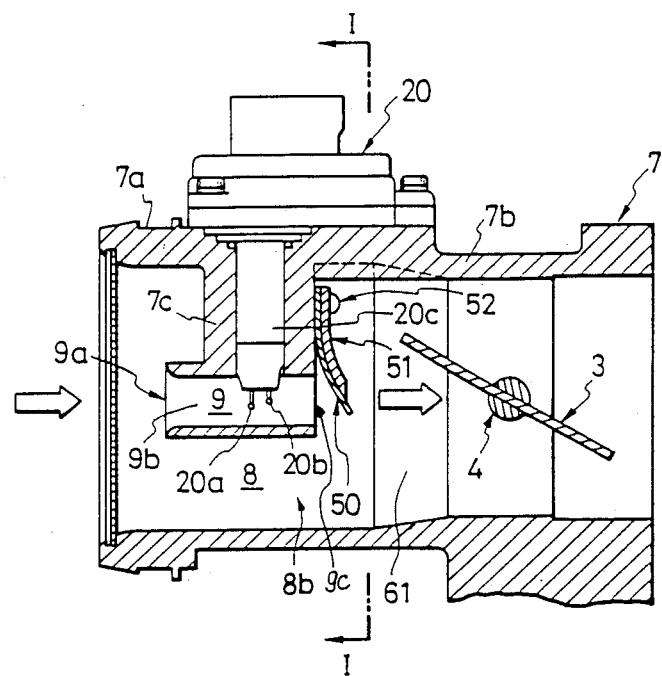
FIG. 6 is a cross-sectional view of a third embodiment of the invention taken along a vertical plane extending along the longitudinal axis of the air flow meter.

In FIG. 6, a body 7 forming the air intake passage includes an air flow meter body portion 7a and a throttle valve body portion 7b downstream of the air flow meter body portion 7a. The air flow meter body portion 7a has a projected portion 7c formed integral therewith in the main passage 8. In this embodiment, unlike the embodiment of FIG. 2, the bypass passage 9 in the projected portion 7c includes only of bypass path 9b extending parallel to the main flow.

At its front end, the projected portion 7c has the bypass passage 9 which is circular in cross section and which includes, from upstream to downstream, an opening 9a, a bypass path 9b in the bypass passage 9 extending in parallel to the main passage 8 and an opening 9c. The bypass passage 9, together with the main passage 8, forms a branching and a merging flow path. A hot-wire element 20a and a temperature compensation element 20b are installed in the bypass path 9b and mounted on a holder 20c, which is integral with the sensor circuit unit 20 and inserted in a hole in the air flow meter body 7a. The main passage inlet 8a and the bypass passage inlet 9a are each formed with a moderately curved throttle on their inner surfaces. A check valve 50 is provided on a surface of the projected portion at the bypass passage outlet 9c which is perpendicular to the main passage 8 to prevent dynamic pressure of the reverse flow from entering the bypass passage 9. The check valve 50 is supported on a retainer 51, which is shorter than the valve 50 and fixed to the projected portion 7c by bolts 52, 53. The check valve 50, when the main flow is forward, acts to divert the bypass flow coming out of the outlet 9c of the bypass passage 6 downwardly, reducing the resistance against the bypass flow presented by the lower end of the throttle valve 3. In this example, although the bypass passage 9 is short, it does not pose any serious problem in reducing pulsation in the air streams.

When the bypass passage 9 includes only of a bypass 9b path parallel to the main passage 8, the check valve 50 mounted on the bypass passage 9 with its fulcrum located above the bypass passage outlet 9c will provide a similar effect as presented by a bypass passage made up of two paths, one parallel to the main flow and one perpendicular to the main flow. That is, the flow from the bypass passage outlet 9c is deflected downwardly by the check valve 50, so that it is possible to utilize variations in the fluid resistance in the vicinity of the bypass passage outlet 9c presented by the throttle valve 3 during the forward or reverse flow of the main air stream, as with the preceding embodiments. The check valve 50 also works against the backflow of the main stream in a manner similar to that of the bypass passage wall on the downstream side.

Figure 7:
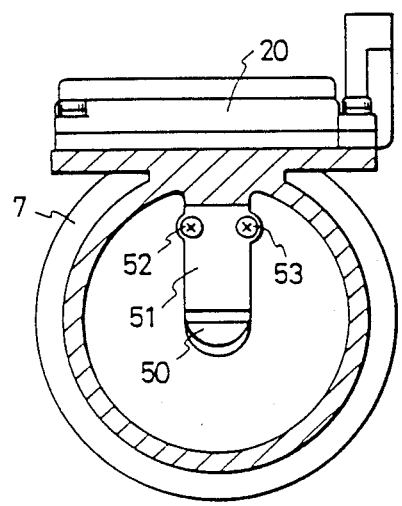
FIG. 7 is a cross-sectional view taken along the line I—I of FIG. 6.

As with the embodiment of FIG. 2, the embodiment of FIG. 6 and 7 also has a throttled portion formed on the inner wall of the throttle valve body portion 7b over a specified region. In this embodiment also, the throttled portion can reduce variations in the flow speed in the bypass passage 9 caused when the rotating angle of the throttle valve 3 changes.

Figure 8:
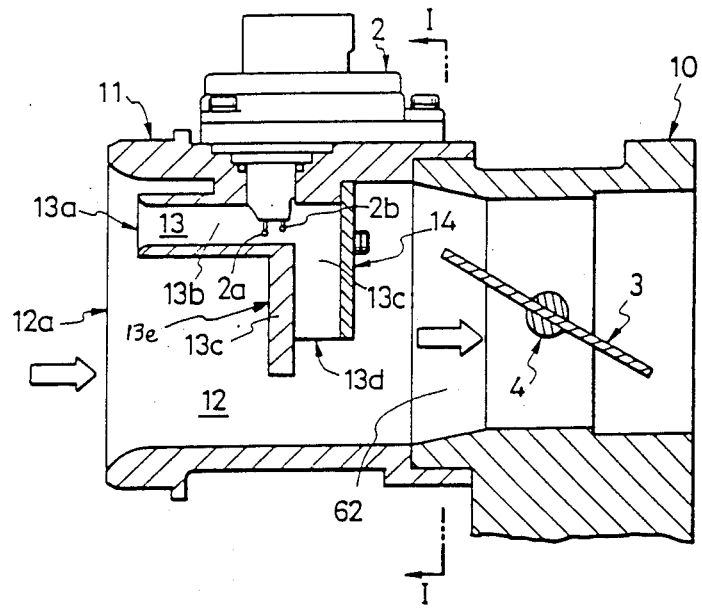
FIG. 8 is a cross-sectional view of a fourth embodiment of the invention taken along a vertical plane extending along the longitudinal axis of the air flow meter.
Figure 9:
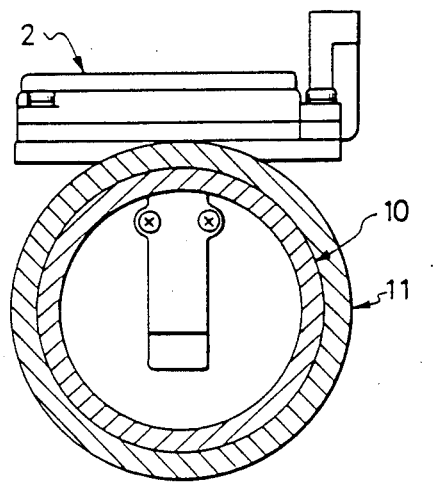
FIG. 9 is a cross-sectional view taken along the line I—I in FIG. 8.

The basic construction of embodiment of FIGS. 8 and 9 is similar to that of the embodiment of FIG. 2. A body 11 is an air flow meter body and 10 is a throttle valve body. The air flow meter body 11 has a projected portion 13e formed integral therewith in the main passage 12. Formed in the projected portion 13e is an L-shaped bypass passage 13 which includes a bypass passage portion 13b extending parallel to the main passage portion 12 and another bypass passage 13c extending perpendicular to the main passage 12. The bypass passage portion 13b is circular in cross section and has an inlet opening 13a on the upstream side of the air flow meter 11. The other bypass passage portion 13c is rectangular in cross section and has an outlet 13d, with opening of the outlet 13d being parallel to the main passage 12. The bypass passage 13 and the main passage 12 together form a branching and merging path.

In this embodiment a throttled portion 62 which has a function identical with that of the embodiment of FIG. 2 is provided in a region corresponding to that in the embodiment of FIG. 2. This embodiment differs from the embodiment of FIG. 2 in that the throttle construction is formed by combining two separate bodies. The upstream side of the throttle valve body, in which the throttled portion 62 is formed on the inner wall on the upstream side, is joined to the downstream side of the air flow meter body 11 in order to form the same throttle structure as that of the embodiment of FIG. 2. This construction has the advantage that the fixing of the downstream side wall plate of the bypass passage 13 by screws can be done easily.

Figure 10:
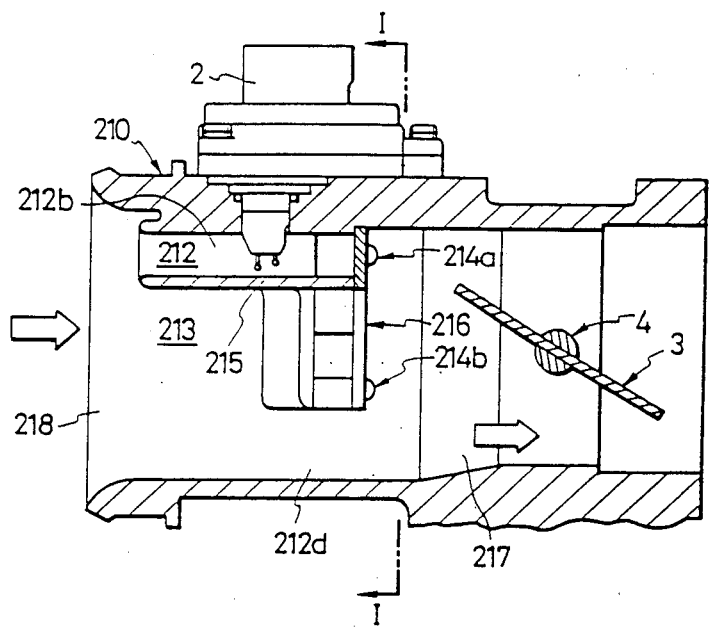
FIG. 10 is a vertical cross-sectional view of a fifth embodiment of the invention.
Figure 11:
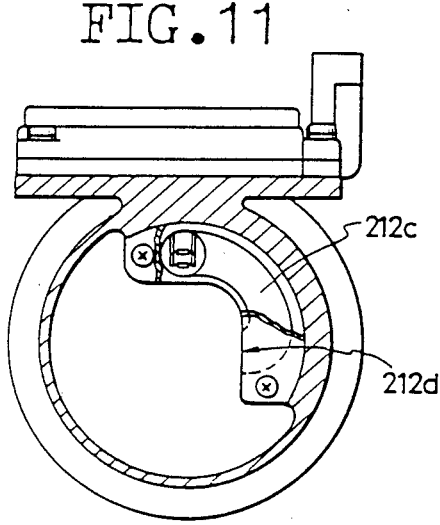
FIG. 11 is a view taken in the direction of the arrows I—I in FIG. 10.
Figure 12:
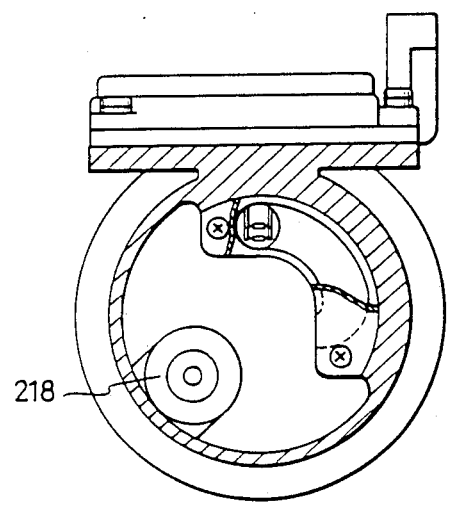
FIG. 12 is a cross-sectional view of a sixth embodiment of the invention, taken along the line I—I in FIG. 10.
Figure 13:
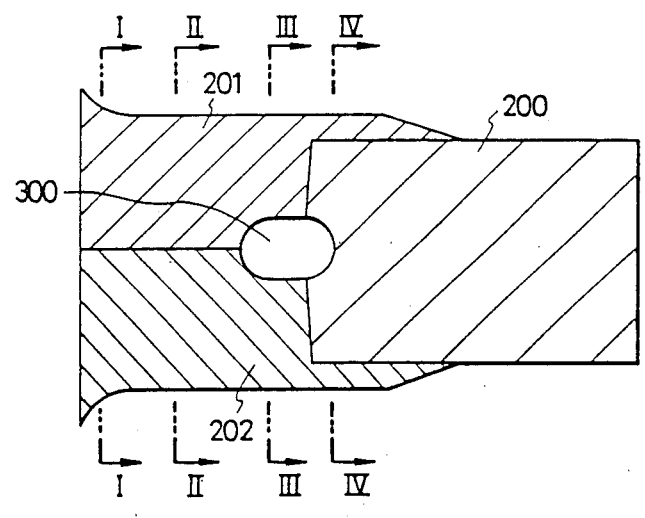
FIG. 13 is a cross-sectional view of cross-sectional view of assembled inner molds for integrally forming the air flow meter body of FIG. 2, taken along a horizontal plane extending along a longitudinal axis line of the inner mold assembly.
Figure 14:
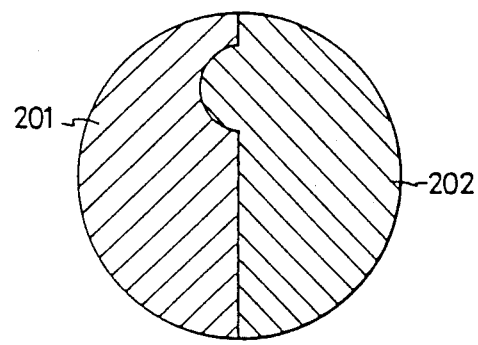
FIG. 14 is a cross-sectional view taken along the line I—I in FIG. 13.
Figure 15:
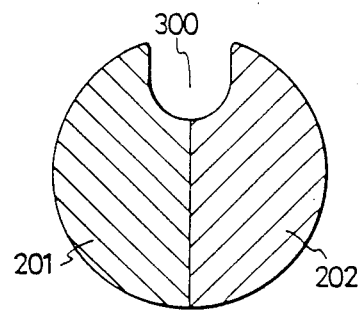
FIG. 15 is a cross-sectional view taken along the line II—II in FIG. 13.
Figure 16:
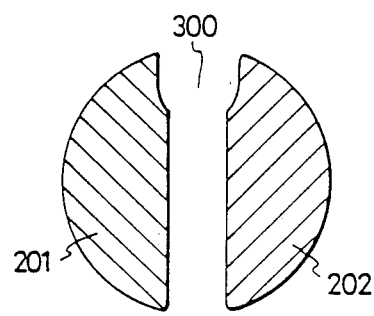
FIG. 16 is a cross-sectional view taken along the line III—III in FIG. 13.
Figure 17:
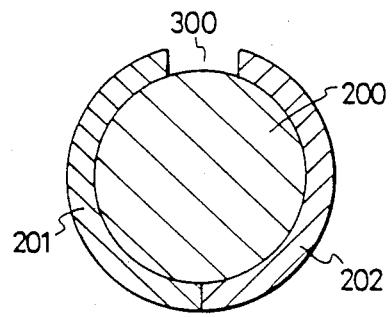
FIG. 17 is a cross-sectional view taken along the line IV—IV in FIG. 13.

In the embodiment of FIGS. 10 and 11, a projected portion 215 of an air flow meter body having a bypass passage 212 is provided along the inner wall of the main passage 213. That is, a portion 212c of the bypass passage 212 that is perpendicular to the main passage 213 is formed in arc along the inner circumference of the main passage 213 through about 90° of center angle, with a bypass outlet 212d opening in the radial direction. The arc portion of the bypass passage 212 is formed by the end mill machining from the side of the throttle valve 3. The wall of the bypass passage 212 on the downstream side is formed by securing a plate cover 216 to the bypass passage 212 by bolts 214a, 214b. The fluid resistance of the bypass passage 212 thus formed consists of a pipe's geometrical resistance presented by a right angle bent and a 90-degree-arc elbow with a small curvature and a square cross section, and a frictional resistance of the inner wall of the passage. The magnitude of the fluid resistance can be made larger than those of the embodiments of FIGS. 2-9 by properly selecting the length and cross section of the arc passage so as to damp pulsation in the stream and to increase resistance against backfire. Arranging the bypass passage 212 in an arc has the advantage that when an injector 218 is installed upstream of the throttle valve 3 in a single point injection system as in the sixth embodiment of FIG. 12, installation can be greatly facilitated.

As in the embodiments of FIGS. 2-9, this embodiment also has a throttled portion 217 on the wall of the throttle valve body in a specified region to reduce variations in the air flow speed in the bypass passage 212 caused by changes in the rotating angle of the throttle valve 3.

FIGS. 13 to 17 show inner molds to die-cast the hot-wire air flow meter body for internal combustion engines which is formed integral with the throttle valve device. In each of the Figures are shown an inner mold 200 to form the throttle valve body 1b of FIG. 2 and inner molds 201 and 202 to form the air flow meter body 1a. These three inner molds have a hollow space 300 for the projected portion 1d of FIG. 2. The throttled portion 60 is formed by combining the inner mold 200 with the inner molds 201 and 202 through the abutting surface and overlapping surface.

This configuration of the inner molds 201, 202 is determined from the fact that to make the inner molds 201, 202 removable after die-casting in one piece the air flow meter body, which has a projected portion in the main passage with the main passage cross section decreasing downstream of the projected portion, requires that the joint surface be made up of an abutting surface and an overlapping surface.

This method of molding permits the hot-wire air flow meter of this invention to be molded with ease.

Figure 18:
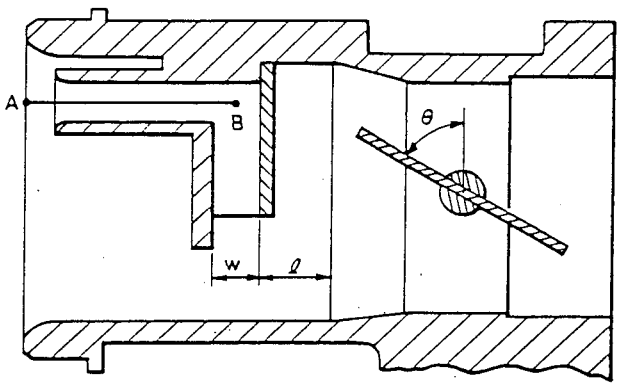
FIG. 18 is a simplified cross-sectional view of the embodiment of FIG. 2.
Figure 19:
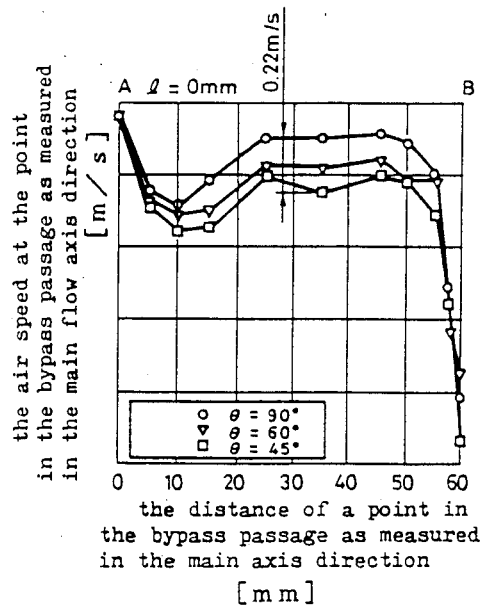
FIGS. 19 and 20 are graphical illustrations of the relationship between the distance of a point in the bypass passage as measured in the main flow axis direction from the inlet of the air flow meter of FIG. 18 and the air speed at the point in the bypass passage as measured in the main flow axis direction.
Figure 20:
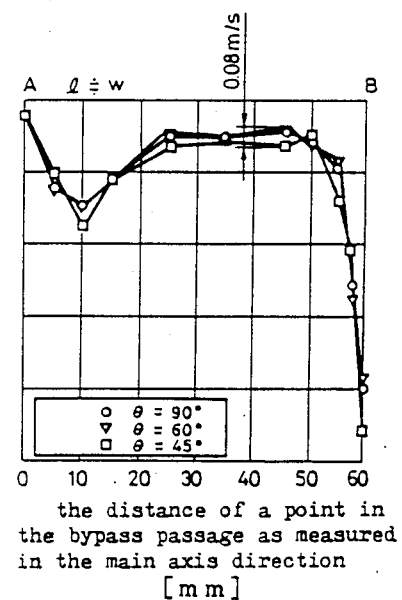

FIGS. 19 and 20 graphically illustrate the results of numerical experiments showing how the throttled portion provided downstream of the bypass passage outlet helps reduce variations in the air flow speed in the bypass passage caused by changes in the rotating angle of the throttle valve. FIG. 18 is an outline and also an equivalent of the embodiment of FIG. 2. Using this model, numerical experiments were carried out whereby a distance measured in the main flow axis direction from the bypass passage outlet to the inlet of the throttled portion was changed. In the tests, the air flow speed in the bypass passage was measured while changing the throttle valve angle $\theta$, under the boundary condition in which a uniform flow of 2 m/sec was supplied in the main passage axis direction to the upstream inlet of the air flow meter body. The results of the numerical experiments shown here represent two cases: one in which the l dimension is 0 mm, which is shown in FIG. 19, and one in which the l dimension is almost equal to w, the bypass passage outlet size as measured in the main passage axis direction. The latter case is shown in FIG. 20.

In FIGS. 19 and 20, points indicated by blank circles, triangles and squares represent air speeds on the line running through the center of the circular cross section of the bypass passage in parallel with the main flow axis, from the air flow meter inlet opening downstream. The blank circles, triangles and squares are plotted for various throttle angles $\theta$ as parameter, and represent the air flow speeds at $\theta = 90°$, 60° and 45° respectively. Comparison of FIGS. 19 and 20 shows that the magnitude of variation in the air speed in the bypass passage caused by changes in the throttle valve angle is reduced from the maximum variation 0.22 m/sec when the throttled portion is provided immediately after the bypass passage outlet to the corresponding maximum variation 0.08 m/sec when it is provided following a straight pipe section of the same cross section as that of the main passage. This means that the provision of a straight pipe section, i.e., keeping the cross section constant over a specified range, is effective in reducing the adverse effect from the angular change of the throttle valve. In terms of reducing the overall length of the air flow meter in the direction of the main passage axis, it is desired that the length of the straight pipe section be as short as possible. It was found, however, that the straight pipe section is effective enough in reducing the adverse effect of the throttle valve angular variation if its length is almost equal to only the size of the bypass passage outlet as measured in the main flow direction. This means that the invention can be put to practical use.

In summary, this invention has the following advantages namely, a reduction in adverse effects on the bypass air flow speed, which are caused by delaminated or disturbed flows that occur when the throttle valve provided downstream of the bypass passage outlet rotates or when the air flow is decelerated or when the bypass flow merges with the main flow; a reduction in the body size as measured in the direction of main flow axis; and, because of the above advantages, a reduction in the weight and size of the air flow meter while maintaining the stable main-bypass flow ratio characteristic.

We claim:

1. A hot-wire air flow meter for an internal combustion engine, comprising:
   a main passage forming part of an air intake flow passage of the internal combustion engine;
   a hot wire element for measuring a quantity of air drawn in the main passage; and
   a bypass passage disposed in said main passage and containing said hot wire element;
   wherein said main passage includes a throttled portion formed between the bypass passage and a position in said main passage where a throttle valve is to be located downstream of the bypass passage;
   wherein said bypass passage has an L-shaped configuration including a first flow path portion formed in an axial direction of said main passage, and a second flow path portion formed in a radially inward direction of said main passage and extending across a center axis of said main passage; and
   wherein said throttled portion is located in said main passage in a region which is downstream of a point spaced from the outlet of said bypass passage by a distance approximately equal to the width of an outlet opening of said second flow path portion.

2. A hot-wire air flow meter as set forth in claim 1, wherein the hot-wire element is installed in the first flow path portion of the bypass passage.

3. A hot-wire air flow meter as set forth in claim 1, wherein the first flow path portion of the bypass passage is eccentric with respect to a center axis of the main passage.

4. A hot-wire air flow meter as set forth in claim 1, wherein a throttle means for constricting air flow is provided at an inlet of the bypass passage.

5. A hot-wire flow meter as set forth in claim 1, wherein a member forming the main passage and a member forming the bypass passage are integrally formed with each other.

6. A hot-wire flow meter according to claim 1, wherein said throttled portion is located in said main passage upstream of the pivot point of the throttle valve by a distance of approximately one-half the radius of said throttle valve.

7. A hot-wire air flow meter according to claim 1, wherein said portion of said main passage between the outlet of said bypass passage and said throttled portion is a straight pipe section having a constant diameter.

8. A hot-wire air flow meter according to claim 1, wherein a member forming the main passage and a member forming the bypass passage are integrally formed with each other.

9. A hot-wire air flow meter according to claim 1, wherein said throttled portion is located in said main passage upstream of the pivot point of the throttle valve by a distance of approximately one-half the radius of said throttle valve.

10. A hot-wire air flow meter according to claim 9, wherein the portion of said main passage between the outlet of said bypass passage and said throttled portion is a straight pipe section having a constant diameter.

11. A hot-wire air flow meter for an internal combustion engine, comprising:
    a main passage forming part of an air intake flow passage of the internal combustion engine;
    a hot wire element for measuring a quantity of air drawn in the main passage; and
    a bypass passage containing the hot wire element;
    wherein said main passage includes a throttled portion formed between the bypass passage and a position in said main passage where a throttle valve is to be located downstream of the bypass passage; and
    wherein said bypass passage has an L-shaped configuration including a first flow path portion formed in an axial direction of said main passage, and a second flow path portion extending in a radially inward direction within said main passage and having an outlet portion forming an outlet opening of said bypass passage, said outlet portion including at the upper stream portion thereof a projection which projects beyond the lower stream portion of the outlet portion so as to shield said outlet opening from air flow in said main passage.

12. A hot-wire flow meter according to claim 11, wherein said throttled portion is located in said main passage in a region which is downstream of a point spaced from the outlet of said bypass passage by a distance approximately equal to the width of said second flow path portion.

13. A hot-wire air flow meter according to claim 12, wherein said throttled portion is located in said main passage upstream of the pivot point of the throttle valve by a distance of approximately one-half the radius of said throttle valve.

14. A hot-wire air flow meter according to claim 12, wherein the portion of said main passage between the outlet of said bypass passage and said throttled portion is a straight pipe section having a constant diameter.

15. A hot-wire air flow meter according to claim 11, wherein a member forming the main passage and a member forming the bypass passage are integrally formed with each other.

16. A hot-wire air flow meter according to claim 11, wherein said throttled portion is located in said main passage upstream of the pivot point of the throttle valve by a distance of approximately one-half the radius of said throttle valve.

17. A hot-wire air flow meter according to claim 16, wherein the portion of said main passage between the outlet of said bypass passage and said throttled portion is a straight pipe section having a constant diameter.

* * * * *